Oct. 7, 1947.  H. J. BUTLER  2,428,552
WHEEL BRAKE APPARATUS
Filed May 8, 1945  2 Sheets-Sheet 1
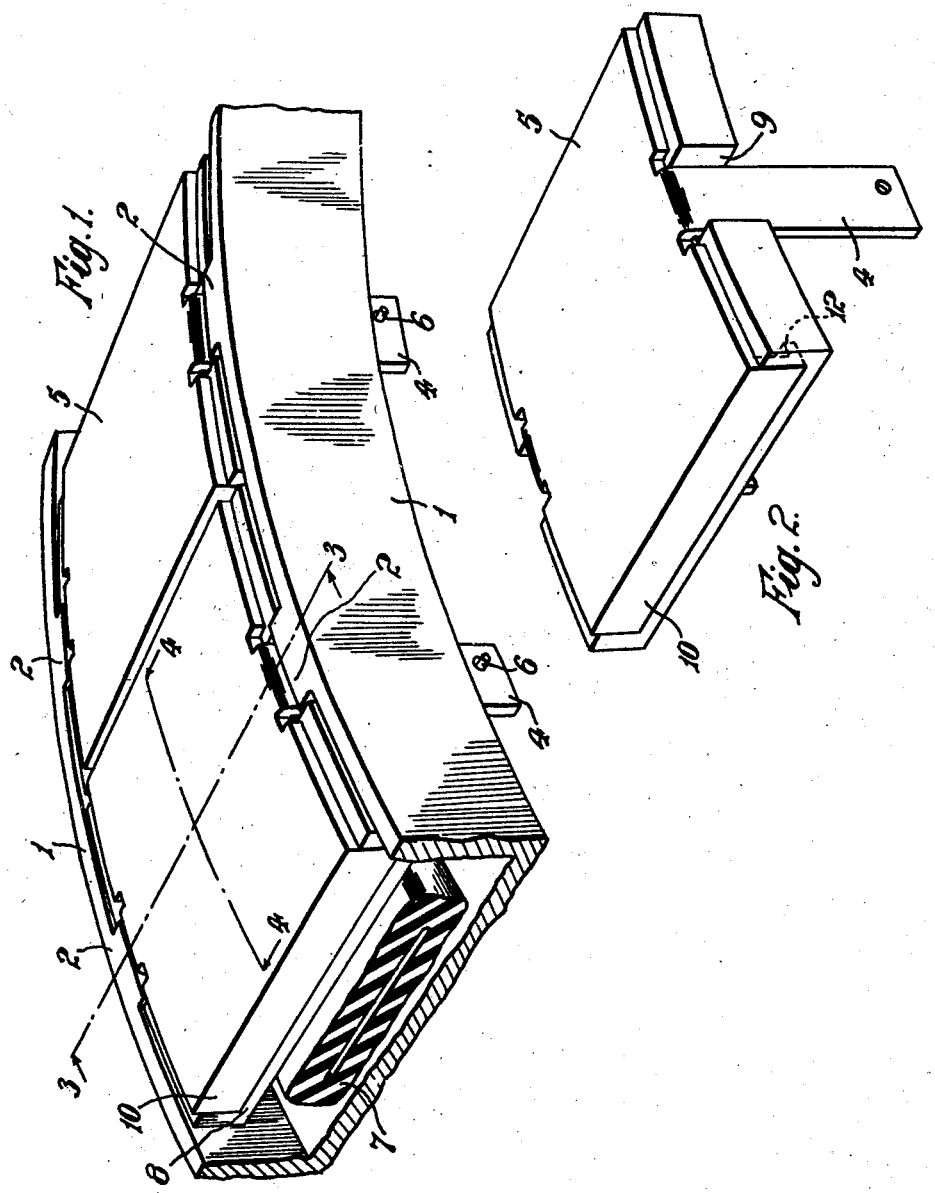
Inventor
Henry James Butler
by Benj. T. Rauber
his attorney Oct. 7, 1947.  H. J. BUTLER  2,428,552
WHEEL BRAKE APPARATUS
Filed May 8, 1945  2 Sheets—Sheet 2

Inventor
Henry James Butler
by Benj. T. Rauber
his attorney

Patented Oct. 7, 1947

2,428,552

UNITED STATES PATENT OFFICE 2,428,552

WHEEL BRAKE APPARATUS

Henry James Butler, Sutton Coldfield, England, assignor to Dunlop Rubber Company Limited, London County, England, a British company Application May 8, 1945, Serial No. 592,706
In Great Britain May 23, 1944

11 Claims. (Cl. 188—152)

This invention relates to improvements in or concerning wheel brake apparatus of the type having shoes provided with lugs or like retractive members which project through apertures in an annular support said brake shoes being movable by the distention of an element interposed between said brake-shoes and said support.

In aircraft brake wheels such annular supports are commonly formed of aluminium or like alloy in order to minimise weight, but such alloys are comparatively soft and in consequence the support made therefrom is liable to suffer damage by contact with the lugs or like retractive members of the braking elements particularly when such members are heated on the application of the brakes.

The invention has for its object to facilitate the use of metal brake shoes and lugs or like retractive members without damage to the distensible element and to the annular support when such brake shoes and their retractive members become heated on operation of the brakes.

According to this invention wheel brake apparatus of the type having brake-shoes provided with retractive members extending through apertures in an annular support said brakes being movable radially by distention of a member interposed between said shoes and said support, comprises metallic brake-shoes having secured thereto heat insulating blocks positioned between said shoes and said support.

Preferably the heat insulating blocks are provided with recesses which fit projections formed on the walls of said support, and the base of said support with apertures of a size sufficient to provide clearance between the lugs or like retractive members and the support.

In order that the invention may be readily understood and carried into effect, the invention will now be described with reference to the accompanying drawings in which:

Fig. 1 is a fragmentary perspective view of wheel brake apparatus constructed in accordance with the invention.

Fig. 2 is a perspective view of a brake shoe for use with the apparatus shown in Fig. 1.

In the preferred construction an annular support 1 of channel section is provided on opposite sides at circumferential intervals with projections 2 of rectangular cross-section constituting torque resisting abutments.

Figure 3:
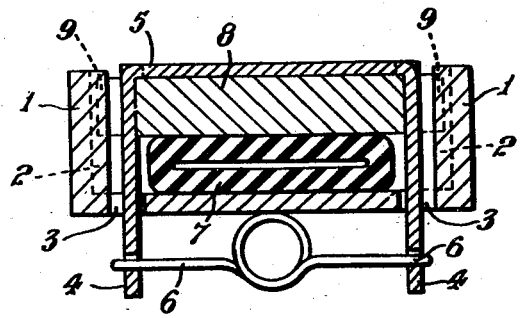
Fig. 3 is a sectional view on the line 3—3, of Fig. 1.
Figure 4:
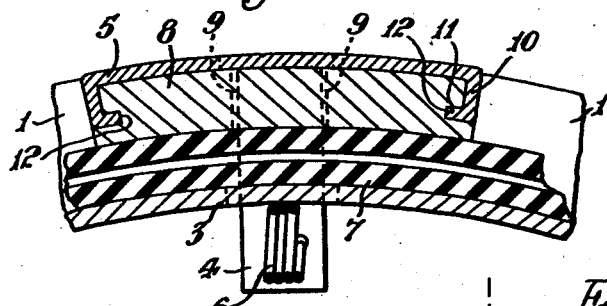
Fig. 4 is a sectional view on the line 4—4 of Fig. 1.

The base of the channel section of the annular support is provided with pairs of apertures 3 Figs. 3 and 4 disposed adjacent each of the projections. Through each aperture projects one of a pair of retractive members 4 which extend from opposite sides of the central portion of each of a series of metallic brake-shoes 5 located between the walls of the channel section of the support. The free end of each retractive member is slotted for the attachment of a spring or springs 6 adapted to bear on the inner periphery of the support as shown in Fig. 3 whereby the brake-shoes are withdrawn radially to their inoperative position on deflation of the distensible element 7.

The apertures 3 through which the retractive members 4 extend may be rectangular in plan view and are of a size sufficient to present a clearance insulating the metal of the retractive members 4 from the support 1 which may be of lightweight metal.

Secured to the under surface of each brakeshoe 5 and interposed between such brake-shoe and the distensible element 7 is one of a series of heat insulating blocks 8 each block being provided on opposite sides with lateral recesses in which the walls 9 are adapted to fit and slide against the torque resisting projections 2 formed on the annular support. The recesses are carried axially inwards to a distance sufficient to clear the retractive members.

The metal brake-shoes 5 may be provided with sintered metal brake surfaces and the metal ends of each shoe may be bent radially downwards at 10 and inwards at 11 into recesses 12 formed in the opposite ends of each insulating block.

In order that the edges of the brake-shoes shall not abrade or tend to burn or fuse the sides of the support during movement relative thereto, the brake-shoes 5 are preferably of narrower width than the insulating blocks 8; the recesses 12 being of a correspondingly reduced width so that the brake-shoes are positioned on the blocks with a narrow gap or clearance between the metal edge of each shoe and the metal side wall of the support adjacent such edge.

The distensible element 7 may consist of an annular tube of rubber or rubber-like material; alternatively such distensible element may consist of a distensible laminated metal structure.

The brake drum of the wheel with which the brake-shoes contact may also be provided with a surface layer of sintered metal.

Figure 5:
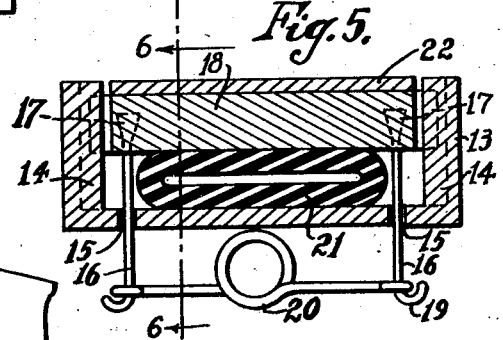
Fig. 5 is a sectional view, similar to that of Fig. 3, of a modified embodiment of the invention.
Figure 6:
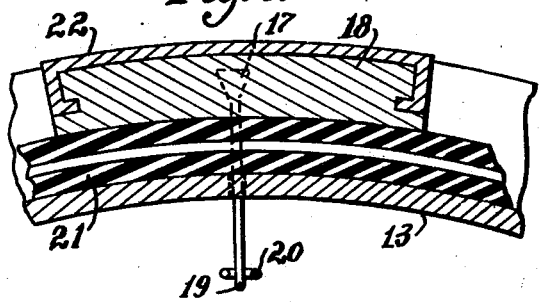
Fig. 6 is a sectional view similar to that of Fig. 4.

In the modification shown in Figs. 5 and 6 the construction of the annular support 13 is similar to the support in Figs. 3 and 4, being provided at intervals with projections 14 and apertures 15 disposed adjacent each of the projections. Through each aperture projects one of a pair of retractive members 16 the upper or outer ends of which are enlarged or widened as at 17 and embedded in the insulating blocks 18. The lower ends of the retractive members 16 are formed with hooks or loops 19 engaging the ends of the spring member 20 which bears against the lower or inner surface of the channel shaped supporting member. A distensible element 21 is confined between the annular support 13 and the insulating blocks 18. The insulating block is covered or faced with a metallic brakeshoe 22, the ends of which are engaged in recesses in the insulating blocks as in Figs. 3 and 4. The insulating blocks are recessed to engage the projections 14 and to be held thereby against movement circumferentially of the annular support.

In this construction the distensible member 21 and the annular support are insulated from the metallic brakeshoe 22.

Having described my invention, what I claim is:

1. Wheel brake apparatus comprising a circular support having a pair of spaced circumferential walls to form an outwardly opening channel, said walls having projections at intervals extending into said channel, said channel having openings in its base, insulating blocks in said channel having radial grooves to receive said projections to hold said blocks from circumferential movement but to permit radial movement, a distensible member between the base of said channel and said insulating blocks, brake shoes mounted on said insulating blocks and having projections extending through the openings of the base and of smaller dimension than said openings to provide clearance without contact with said base and resilient means to press said shoes to said base.

2. Wheel brake apparatus comprising a circular support having a pair of spaced circumferential walls to form an outwardly opening channel, said walls having projections at intervals extending into said channel, said channel having openings in its base, insulating blocks in said channel having radial grooves to receive said projections to hold said blocks from circumferential movement but to permit radial movement, a distensible member between the base of said channel and said insulating blocks, brake shoes mounted on said insulating blocks and having extensions through the openings of the base and of smaller dimensions than said openings to provide clearance without contact with said base and springs engaging said extensions and bearing against said support to press said brake shoes toward the base of said channel.

3. Wheel brake apparatus comprising a circular support having a pair of spaced circumferential walls to form an outwardly opening channel, said walls having projections at intervals extending into said channel, said channel having openings through its base, insulating blocks in said channel having radial grooves to receive said projections to hold said blocks from circumferential movement but to permit radial movement, a distensible member between the base of said channel and said insulating blocks, metal brake shoes mounted on the outer surface of said insulating blocks having extensions through the openings of said base and of smaller dimensions than said openings to provide clearance without contact with said base and resilient means to press said shoes toward the bottom of said base.

4. The apparatus of claim 3 in which said metal shoe has a sintered metal brake surface.

5. The brake apparatus of claim 3 in which the ends of said shoes are extended over and interlocked into opposite edges of said insulating blocks.

6. Wheel brake elements which comprises a block of heat insulating material, a metallic brake shoe mounted on the upper surface of said block, said block having vertical grooves in opposite side walls, said brake shoe having extensions in said grooves.

7. Wheel brake elements which comprises a block of heat insulating material having grooves on opposite side surfaces, a metallic brake shoe on the top surface of said block and extending over the opposite ends and engaging into the opposite ends of said brake shoe and having downward extensions within said grooves and projecting below the lower face of said block.

8. The wheel brake element of claim 7 in which the upper surface of said brake shoe is of sintered metal.

9. Wheel brake apparatus comprising a circular support having radial openings, a distensible element mounted on the circumferential surface of said support, brake elements in circumferential series on said distensible element, each brake element comprising an insulating block on said distensible element and having an interengaging surface with said support to permit radial movement relative to said support and to prevent circumferential movement of said block relative to said support and metallic brake shoes mounted on said block and retractive means extending from said brake elements through said radial openings and of smaller dimensions than said radial openings to provide clearance without contact with said support, and resilient retaining means engaging said retractive means and acting against the inner support to hold said brake elements toward said support.

10. Wheel brake apparatus comprising a circular support having a pair of spaced circumferential walls to form an outwardly opening channel and having radial openings at spaced intervals, brake elements in said channel each comprising an insulating block having interengaging surfaces with said circumferential walls to permit radial movement of said block relative to said walls but to prevent circumferential movement of said block about said support and metallic brake shoes mounted on the outer surface of said insulating block and retractive elements extending from said brake elements through the openings in said support and of smaller dimensions than said openings to provide clearance without contact with said support, springs bearing against the inner surface of said support and engaging said retractive elements to hold said brake elements resiliently toward the base of said channel and a distensible member between the base of said channel and said insulating block.

11. The apparatus of claim 6 in which said metallic brake shoe is of less width than said block of heat insulating material and in which its edges are spaced inwardly of the side edges of the block of insulating material.

HENRY JAMES BUTLER.

REFERENCES CITED

The following references are of record in the file of this patent:

UNITED STATES PATENTS

| Number | Name | Date |
| --- | --- | --- |
| 2,185,250 | Frank | Jan. 2, 1940 |
| 2,017,715 | Goodyear et al. | Oct. 15, 1935 |
| 2,252,128 | Kraft | Aug. 12, 1941 |

FOREIGN PATENTS

| Number | Country | Date |
| --- | --- | --- |
| 398,301 | Great Britain | Sept. 14, 1933 |